(12) United States Patent
Okada et al.

(10) Patent No.: US 6,246,502 B1
(45) Date of Patent: Jun. 12, 2001

(54) OPTICAL SCANNING APPARATUS

(75) Inventors: Tohru Okada; Munehiro Takayama; Toshihiko Yoshikawa, all of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/451,143

(22) Filed: Nov. 30, 1999

(30) Foreign Application Priority Data

Nov. 30, 1998 (JP) .................................................. 10-340530

(51) Int. Cl.$^7$ .................................................... G02B 26/08
(52) U.S. Cl. .......................... 359/196; 359/197; 359/204; 340/435; 356/3.09
(58) Field of Search ..................................... 359/196, 197, 359/204; 340/435, 436; 356/3.09

(56) References Cited

U.S. PATENT DOCUMENTS 4,257,703 * 3/1981 Goodrich .............................. 340/435

FOREIGN PATENT DOCUMENTS

| 60-115912 | 6/1985 | (JP) . |
| 62-8119 | 1/1987 | (JP) . |
| 5-45600 | 2/1993 | (JP) . |

* cited by examiner

*Primary Examiner*—Darren Schuberg
(74) *Attorney, Agent, or Firm*—Sughrue, Mion, Zinn, Macpeak & Seas, PLLC

(57) ABSTRACT

An optical scanning apparatus RD scans a laser beam and detects a foregoing vehicle FC present in a forward direction by a reflected beam derived from the laser beam. The apparatus includes a first mode for emitting a narrowed laser beam and a widened laser beam and a second mode for emitting the widened laser beam and the two modes are switched to thereby provide an apparatus for emitting a beam capable of detecting an object in a wide range, causing no detection failure and in compliance with a situation of surrounding objects.

3 Claims, 8 Drawing Sheets

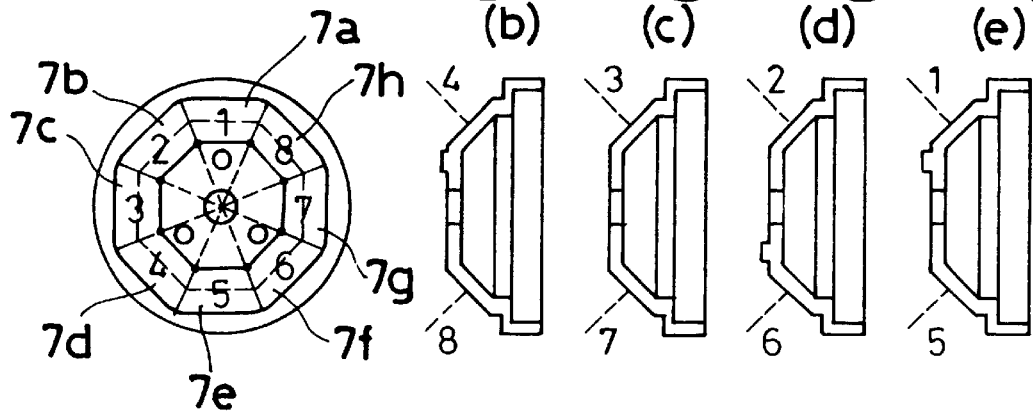
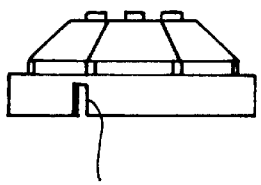
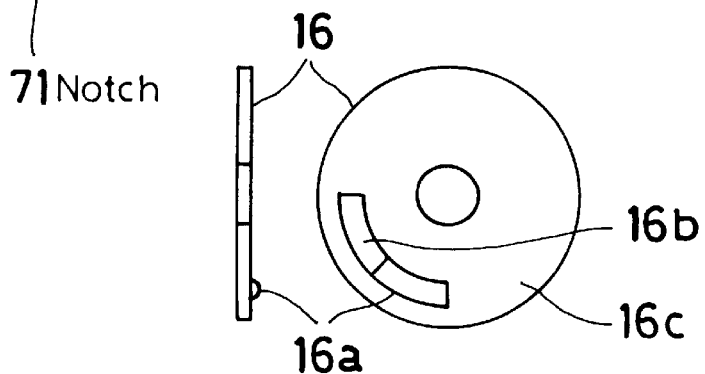
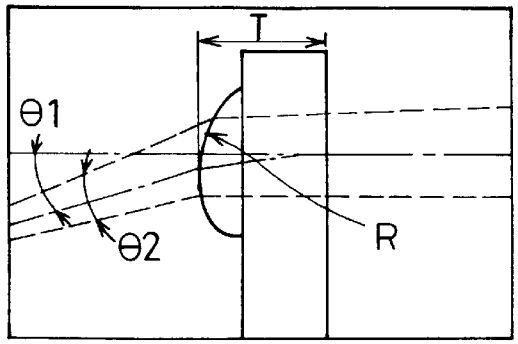

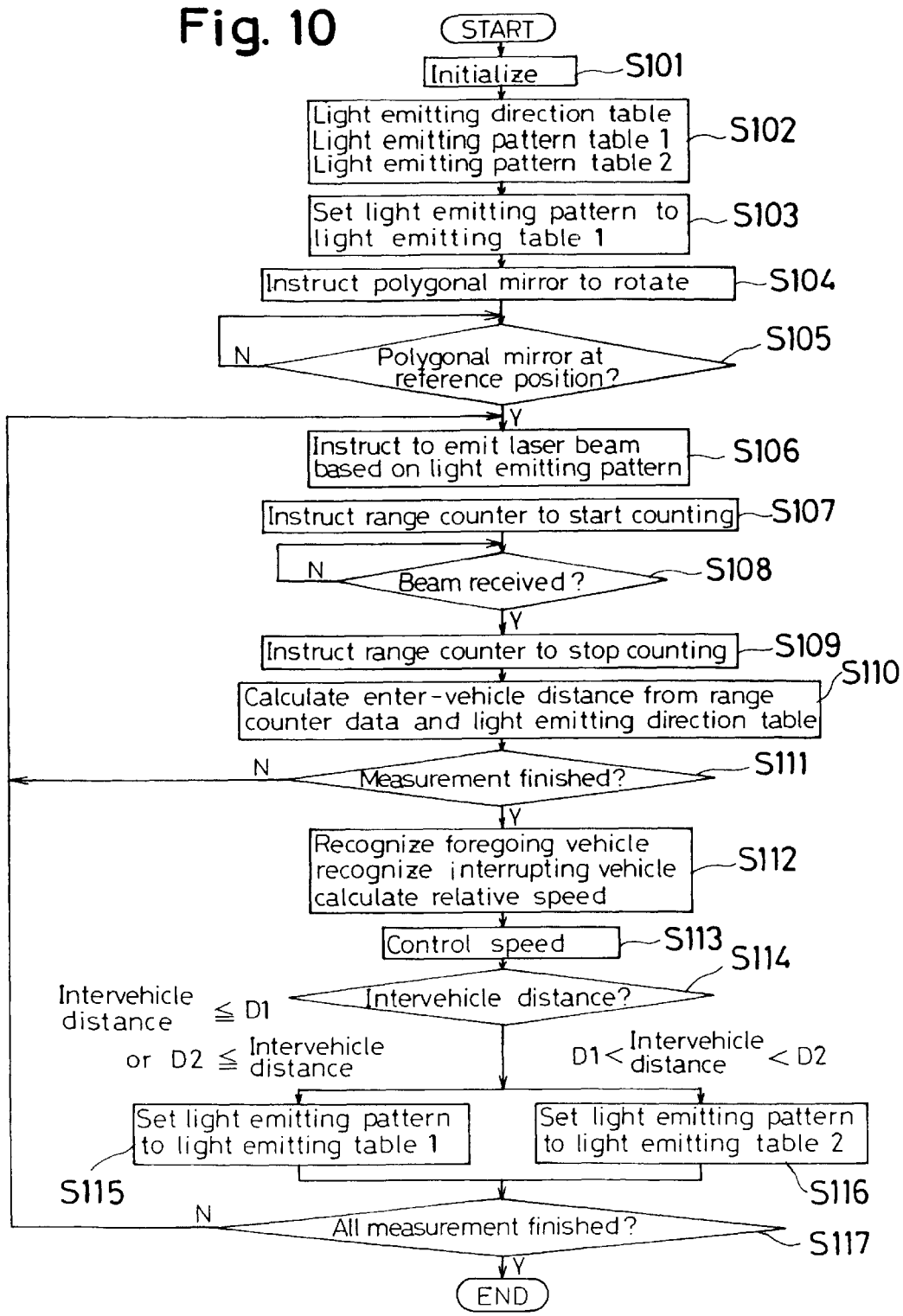

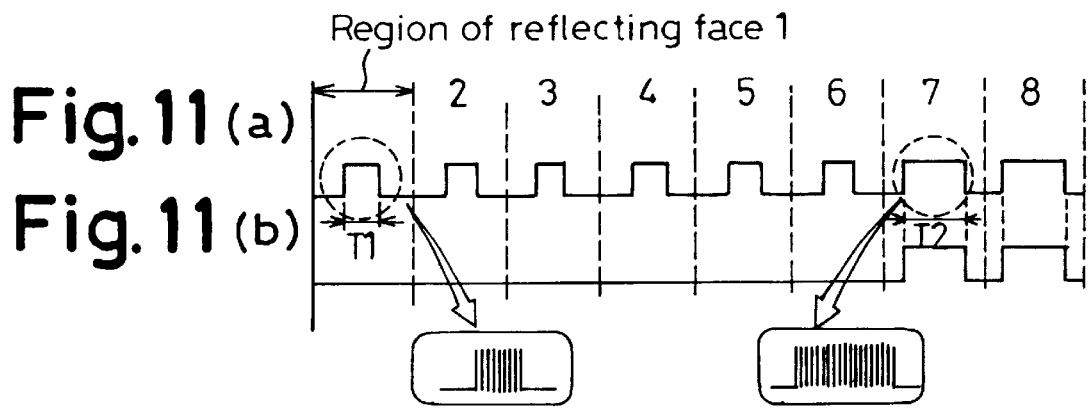
Fig. 11(a)
Fig. 11(b)
Fig. 12
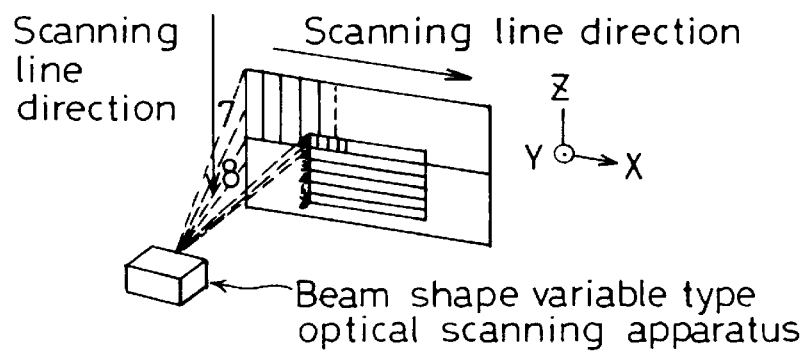
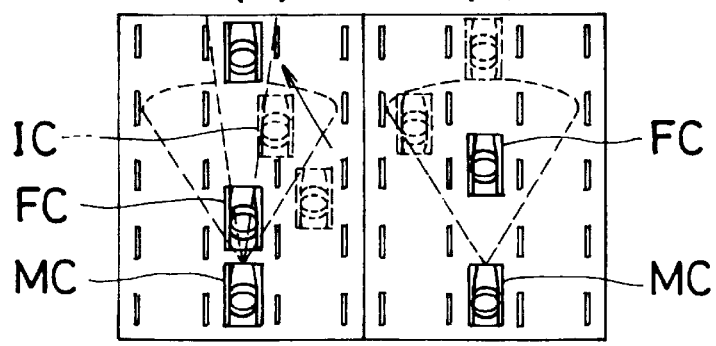
Fig. 13 (a)   Fig. 13 (b)

Scanning direction

OPTICAL SCANNING APPARATUS

BACKGROUND OF THE INVENTION

1. Field of the Invention

The present invention relates to an optical scanning apparatus for detecting an object by scanning a laser beam, particularly to an optical scanning apparatus for making the width of an emitted laser beam (beam width) variable in accordance with the situation of an object present in a forward direction.

2. Description of the Related Art

There has conventionally been known an optical scanning apparatus for detecting an object present in a forward direction by a laser beam. According to such an optical scanning apparatus, there is generally adopted a system in which a mirror is arranged in front of a light emitting element of, for example, a laser diode (LD) or a light emitting diode (LED), where a direction of the beam emitted from a light source is changed by the mirror and an object is detected by scanning the beam.

Accordingly, a polygonal mirror is used for changing the direction of the emitted laser beam. A beam emitted from a laser oscillator is made incident on the polygonal mirror and the direction of the emitted laser beam is changed by reflecting the laser beam by the polygonal mirror. Such a system is disclosed in Japanese Patent Laid-Open No. 115912/1985, Japanese Patent Laid-Open No. 8119/1987 and Japanese Patent Laid-Open No. 45600/1993.

According to the system disclosed in the above-described publications, there is provided a laser oscillator having a laser diode (light source) and a polygonal mirror for deflecting an incident beam. A laser beam emitted from the laser oscillator is made incident on the rotating polygonal mirror and reflected laser beam is emitted to outside. In this case, in order to change a state of deflecting the laser beam, angles of inclination of reflecting faces formed in the polygonal mirror are changed for respective faces and the polygonal mirror is driven to rotate by a motor to thereby change a direction of emitting the laser beam which is made incident on the polygonal mirror and reflected thereby and deflect the emitting direction two-dimensionally in a constant shape of the beam.

Specifically, as shown in FIG. 15, a polygonal mirror having six faces is provided with reflecting face angles ($\theta 1$, $\theta 2$, ... $\theta 6$) respectively in its reflecting faces. By rotating the polygonal mirror in the direction of the arrow by a drive apparatus such as a motor or the like, the incident direction of an incident laser beam reflected by a reflecting plate, is changed by the rotation. For example, when a laser beam is emitted in a predetermined light emitting pattern and is made incident on the polygonal mirror, the polygonal mirror is rotated with respect to one reflecting face having an angle of inclination of $\theta 1$ as shown in FIG. 15. A position irradiated with the laser beam is scanned from left to right and the scanning is executed by one line in the horizontal direction. Thereafter, when a position on which the laser beam is incident is shifted to a successive reflecting face having an angle of inclination of $\theta 2$ by rotating the polygonal mirror, the scanning line is changed in the vertical direction and a second scanning is carried out. By similarly carrying out scanning of a third through a sixth line, two-dimensional scanning is carried out in a predetermined region.

When an object in a forward direction is detected by laser beam or a distance to the object is measured, an optical intensity and a measured distance are defined generally by a radar equation, shown below.

$$Prtn = Pout \cdot \frac{Aref \cdot Ak \cdot K \cdot \alpha 0 \cdot \alpha r}{d^4 \cdot \theta_1 \cdot \theta_2 \cdot \left(\frac{\phi}{2}\right)^2} \cdot T^2$$

where Prtn: intensity of reflected beam (W). Pout: peak output of light source (W), d: measured distance (m), $\alpha O$: transmittance of light transmitting system, $\alpha r$: light transmittance of light receiving system, K: reflectivity of targeted object, $\theta_1$: transmitted beam horizontal divergence angle (rad), $\theta_2$: transmitted beam vertical divergence angle (rad), $\phi$: divergence angle of reflected beam (rad), Aref: area of target object (m$^2$), Ar: received portion opening area (m$^2$), T: transmittance of atmospheric air (changed by meteorological condition).

According to the radar equation, when light intensity (light source peak output) is fixed, the measured distance d is changed by a shape $\theta 1$, $\theta 2$ of emitted beam. For example, when the light source peak output is fixed and irradiation angles (beam angles) of the laser beam in the horizontal and vertical directions are made as proximate to those of a parallel beam as possible (beam is narrowed), the measured distance d becomes long and when the beam angles are diverged (widened), the measured distance is shortened.

When an apparatus for emitting a laser beam is applied to an inter-vehicle distance control based on the above-described feature, there is adopted a method of scanning a wide area by narrowed beam. In this case, laser beam is irradiated with a remote object (here, a foregoing vehicle) as a target and accordingly, a scanning area (detecting area) is narrowed in a very short distance. Therefore, when an interrupting vehicle enters within a short distance from the horizontal direction, the detection is retarded, control is retarded when an inter-vehicle distance between a foregoing vehicle and a driving vehicle is calculated from information based on reflected beam of laser beam and speed control of the driving vehicle is carried out based thereon and accordingly, a desired function cannot be achieved sufficiently.

In the case of carrying out follow-up running, when an optical scanning apparatus is used as a sensor for detecting a foregoing vehicle, laser beam is emitted with a reflector at a rear face of a vehicle having high optical reflectivity as a target. Generally, as prescribed in Safety Code Article 38, Paragraph 5 the height for attaching the reflector is prescribed to be equal to or larger than 0.25 m and equal to or smaller than 1.5 m and in the case in which a road is provided with a maximum road width of 3.5 m, when there is a foregoing vehicle at a very short distance (for example, 10 m or smaller), there is produced an area which cannot detect the reflector by the laser beam. Accordingly, only with beam by the current scanning operation, there causes a failure in detection in respect of a target (foregoing vehicle) at a very short distance (for example, about 10 in through 30 m) and a countermeasure there against is needed.

SUMMARY OF THE INVENTION

Hence, the present invention has been carried out in view of the above-described problem and it is a technological problem thereof to emit a beam capable of detecting an object in a wide range and in compliance with a situation of surrounding objects without causing a failure of detecting.

As technological means devised for resolving the above-described problem, according to an aspect of the invention, there is provided an optical scanning apparatus for, emitting a laser beam to scan in a forward direction and detect an object in the forward direction by a reflected beam derived from the laser beam, the optical scanning apparatus including a first mode of emitting a narrowed laser beam and a widened laser beam and a second mode of emitting the widened laser beam, wherein the first mode and the second mode are switched.

Accordingly, there is provided the first mode of emitting the narrowed laser beam and the widened laser beam and the second mode of emitting the widened laser beam and the two modes are switched. Therefore, according to the first mode, which is constituted as a long distance/very short distance mode (mode for both remote and near) in which the laser beam reaches a remote location in a wide range and according to the second mode which is constituted as a very short distance mode in which the laser beam reaches a location in a wide range and the range of emitting the laser beam (detection range by the laser beam) can be varied in a wide range in accordance with the situation.

Accordingly, the modes of the laser beam are switched by, for example, use for long distance/very short distance. When a remote vehicle is detected, the detection is carried out by the narrowed beam and when the detection is carried out for a vehicle at a very short distance, the detection is carried out by the widened beam. When a driving vehicle is interrupted by another vehicle at a very short distance (for example, 15 m forward therefrom) even in the case in which the reflected light from a reflector cannot be detected by the widened laser beam of the first mode, the detection can be carried out by the narrow laser beam of the first mode and therefore, a failure in the detection at a very short distance as in the conventional case can be prevented.

In this case, when the distance between the apparatus and the object or the direction of the object advancing into the range of emission of the laser beam or departing out of the range is detected, from information derived from the reflected light and switching of the modes is carried out, by the mode switching in compliance with the surrounding situation, even in the case in which an object (for example, an interrupting vehicle) enters at a very short distance in the midst of detecting an object at a long distance, by using the widened laser beam, the detection can be carried out firmly by the mode for both remote and near and the object can be detected accurately in accordance with the surrounding situation. In this case, it is confirmed whether a current target object is present remote or near and when the object is present remote, the laser beam is emitted with the beam emitting pattern in the mode of remote and near for detecting an object entering at a very short distance and when the object is near, the laser beam is emitted with the light emitting pattern in the short distance mode.

In this way, by using the optical scanning apparatus capable of changing the beam width of the laser beam, the detection ranges are selectively used. Movement of an interrupting vehicle from a contiguous lane at a short distance can be anticipated. When the optical scanning apparatus is used in follow-up running, the speed of the driving vehicle can be controlled.

Further, pertinent switching can be carried out by constituting the first mode when the distance between the apparatus and the object is equal to or smaller than a first predetermined distance or equal to or larger than a second predetermined distance and constituting the second mode when the distance falls in a range between the first predetermined distance and the second predetermined distance, to thereby construct the remote and near mode in the case of the distance equal to or smaller than the first predetermined distance or equal to or larger than the second predetermined distance and construct the short distance mode in the case of the distance between the first predetermined distance and the second predetermined distance.

With respect to the detection area necessary for an actual road, the apparatus is used mostly in a short distance area in which a driving vehicle is run with an inter-vehicle distance of 10 m or larger with an area at a very short distance. Accordingly, the detection range is designated and the timing of emitting the beam is made variable. Specifically, when the apparatus is used on a high-speed road, an interrupting vehicle is also detected and therefore, a foregoing vehicle is detected by both the beam for long distance and the beam for short distance. When the foregoing vehicle or the interrupting vehicle enters an area in which the detection can be carried out by the beam for short distance, the beam for long distance is not emitted and the apparatus is switched to emit only the beam for short distance. Further, in this case, when a foregoing vehicle is going to enter at a very short distance in view of the relative speed and the inter-vehicle distance between the foregoing vehicle and a driving vehicle, the detection at the very short distance can be carried out by reemitting the beam for long distance.

BRIEF DESCRIPTION OF THE DRAWINGS

FIGS. 7a, 7b, 7c, 7d, 7e and 7f are views showing the shape of the polygonal mirror shown in FIG. 3;

FIG. 8 is a view showing a shape of a cylindrical lens shown in FIG. 3;

FIG. 9 is an explanatory diagram showing how the laser beam is changed by the shape of a lens portion shown in FIG. 8;

FIG. 10 is a flowchart showing processing of a controller shown in FIG. 1;

FIGS. 11a and 11b show light emitting pattern tables of a laser beam shown in light emitting direction patterns of the flowchart shown in FIG. 10;

FIG. 12 is a view showing a scanning range of the optical scanning apparatus according to the embodiment of the invention;

FIGS. 13a and 13b are views showing detection ranges of a laser beam when a mode of the optical scanning apparatus according to the embodiment of the invention is switched;

DETAILED DESCRIPTION OF THE PREFERRED EMBODIMENTS

An explanation will be given of the embodiments according to the invention in reference to the drawings as follows.

Figure 1:
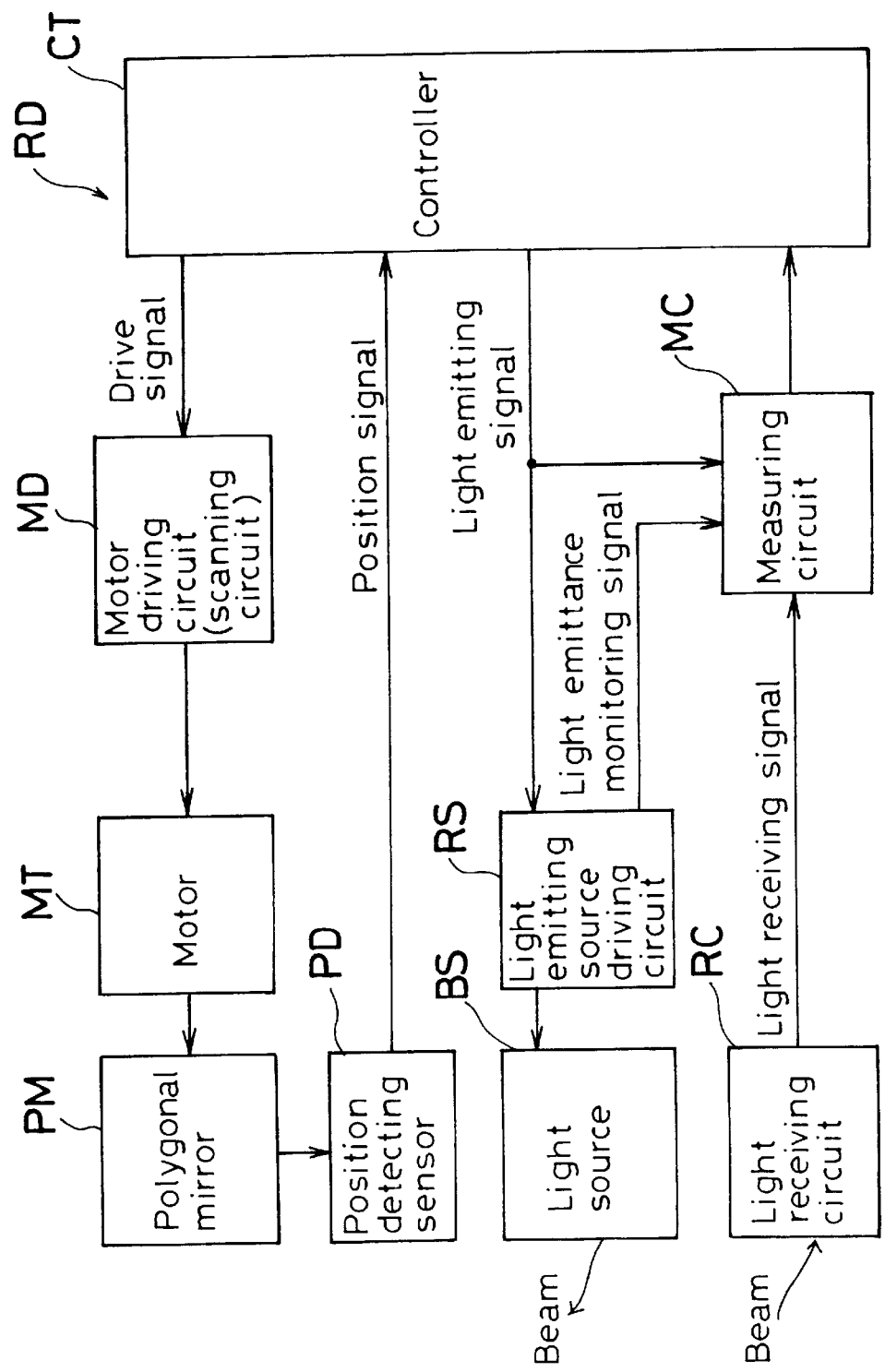
FIG. 1 is a block diagram showing the constitution of an optical scanning apparatus according to an embodiment of the invention.

FIG. 1 is a block diagram of an optical scanning apparatus RD. Although an explanation will be given as follows with regard to the case in which the optical scanning apparatus RD is applied to a vehicle and constitutes a sensor for detecting a foregoing vehicle from the vehicle upon which the sensor is mounted, the optical scanning apparatus RD is not limited thereto.

Now, an explanation will be given of an outline operation thereof in reference to the block diagram of FIG. 1. According to the optical scanning apparatus RD, a light emitting signal for emitting a laser beam is outputted to a light source (laser diode 1 of laser oscillator BS) in a predetermined light emitting pattern. When the light emitting signal is outputted from a controller CT, the light emitting signal is inputted to drive a light emitting source drive circuit RS and a laser beam is emitted from the light source BS (for example, laser oscillator 13). The light source BS emits the beam according to the light emitting signal in a predetermined light emitting pattern (period of ON/OFF) and emits the laser beam to the outside. In this case, the laser beam emitted to outside is provided with straight progressing performance and when there is present an object (here, a foregoing vehicle) in the emitting procedure, the laser beam is incident on the object and a reflected beam of the laser beam incident on the object returns.

Figure 6:
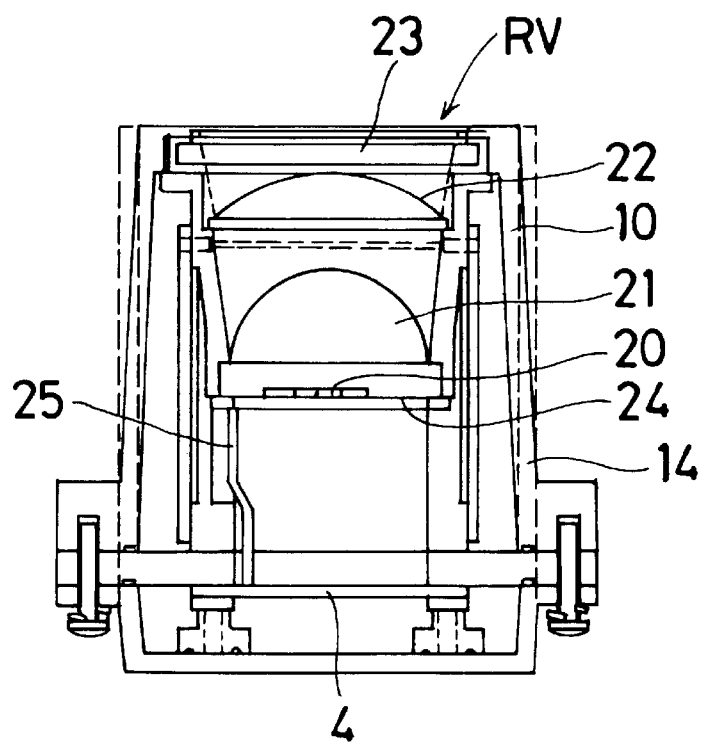
FIG. 6 is a view showing a light receiving unit of the optical scanning apparatus according to the embodiment of the invention.

The reflected beam of the laser which has returned is received by a light receiving unit RV (FIG. 6) and information of the reflected beam (optical intensity, direction in which the laser beam returns, time of return) is inputted to a light receiving circuit RC. The controller CT calculates by a measuring circuit MC by what time period (time difference) the laser beam returns since the laser beam has been emitted to outside from the time of instructing the light emitting signal to output the laser beam, the time of actually outputting the laser beam (based on a light emittance monitoring signal) and the time at which the reflected light returns (based on light receiving signal) and information of the calculated time difference is inputted to the controller CT.

Figure 15:
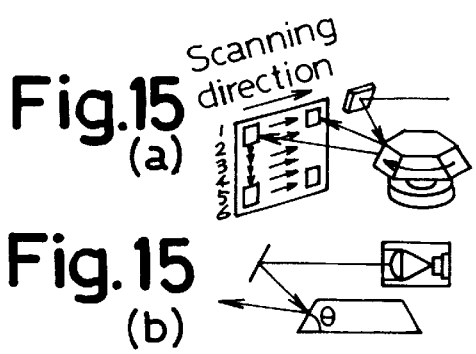
FIGS. 15a, 15b and 15c are explanatory views showing how a direction of emitting laser beam is changed by rotating a conventional polygonal mirror.
Figure 15:
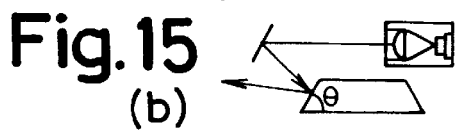
Figure 15:
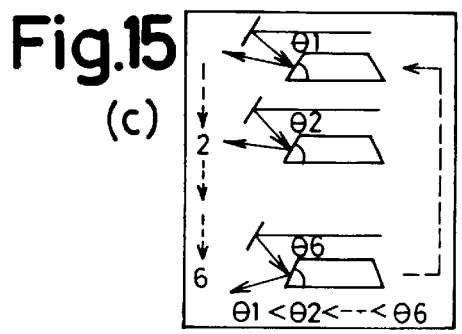

Meanwhile, in the procedure of emitting the laser beam to outside, the direction of emitting the laser beam is changed by using a polygonal mirror PM. The controller CT outputs a motor drive signal to a motor driving circuit MD of a motor MT for rotating the polygonal mirror PM and the motor MT is driven by an output signal from the motor driving circuit MD. The motor MT is attached to the polygonal mirror PM for deflecting the laser beam at its output shaft, a position on which the laser beam is incident is changed by an angle of rotation of the polygonal mirror PM and a direction of emitting the laser beam which is reflected by the reflecting face of the polygonal mirror PM is changed (refer to FIG. 15). Further, there is provided a notch 7i at one location on an outer peripheral side portion of the polygonal mirror PM and a position detecting sensor (photo interrupter) for detecting a rotational position thereof is provided opposite the notch 7i of the polygonal mirror PM. By detecting the position of the notch 7i by the position detecting sensor PD, while detecting a rotational state of the polygonal mirror PM, how the notch 7i is rotated to move from a reference position is stored by a counter value of a counter inside the controller and the rotational position of the polygonal mirror PM is controlled by the controller CT in accordance with a light emitting pattern of the laser beam. Alternatively, the position detecting sensor may be a hole in which a magnet is attached in place of the notch of the polygonal mirror PM, a pickup constituted by the magnet and a coil may be provided.

Figure 2:
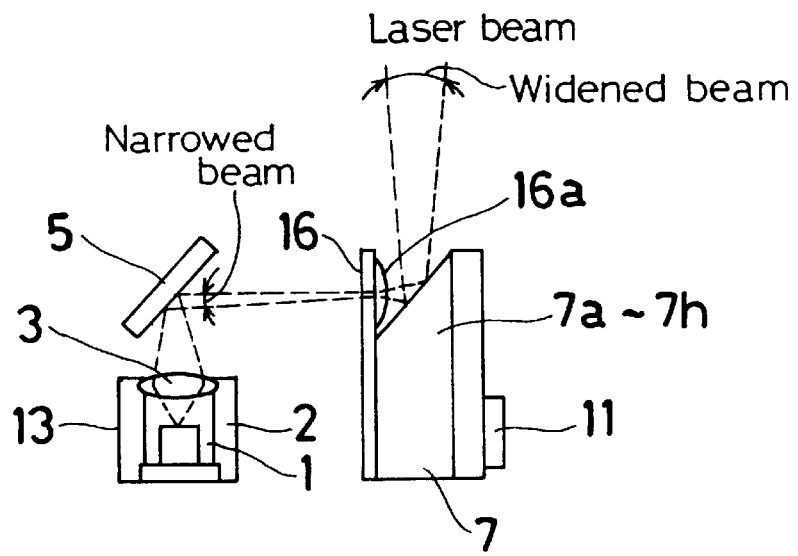
FIG. 2 is an explanatory view showing a beam transmitting unit of the optical scanning apparatus according to the embodiment of the invention.
Figure 3:
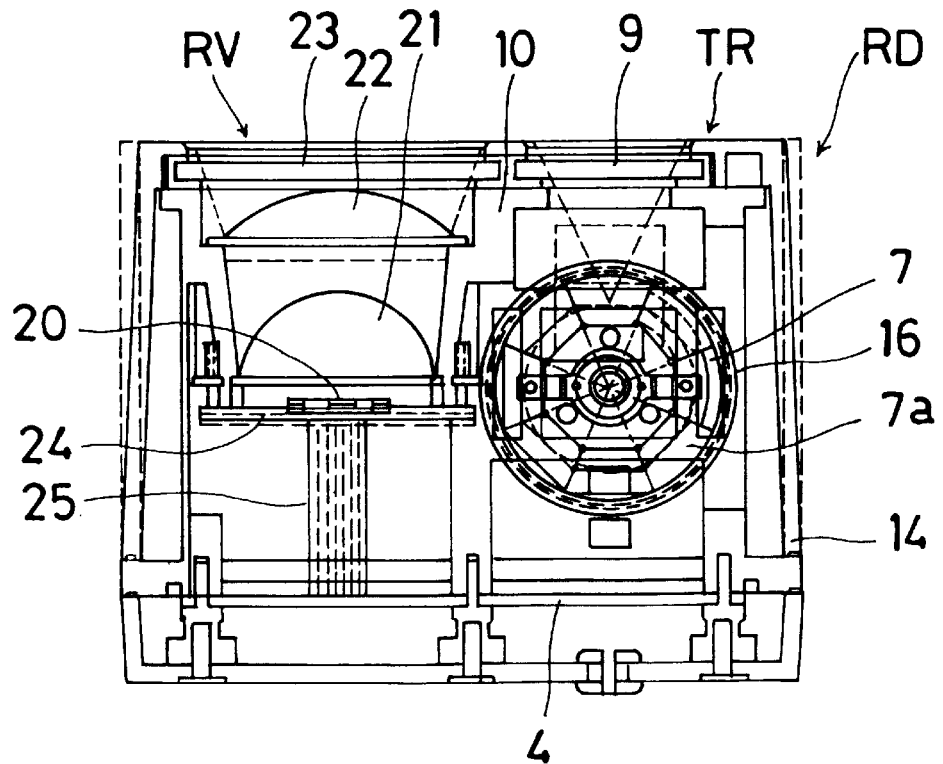
FIG. 3 is a view showing the optical scanning apparatus according to the embodiment of the invention.
Figure 4:
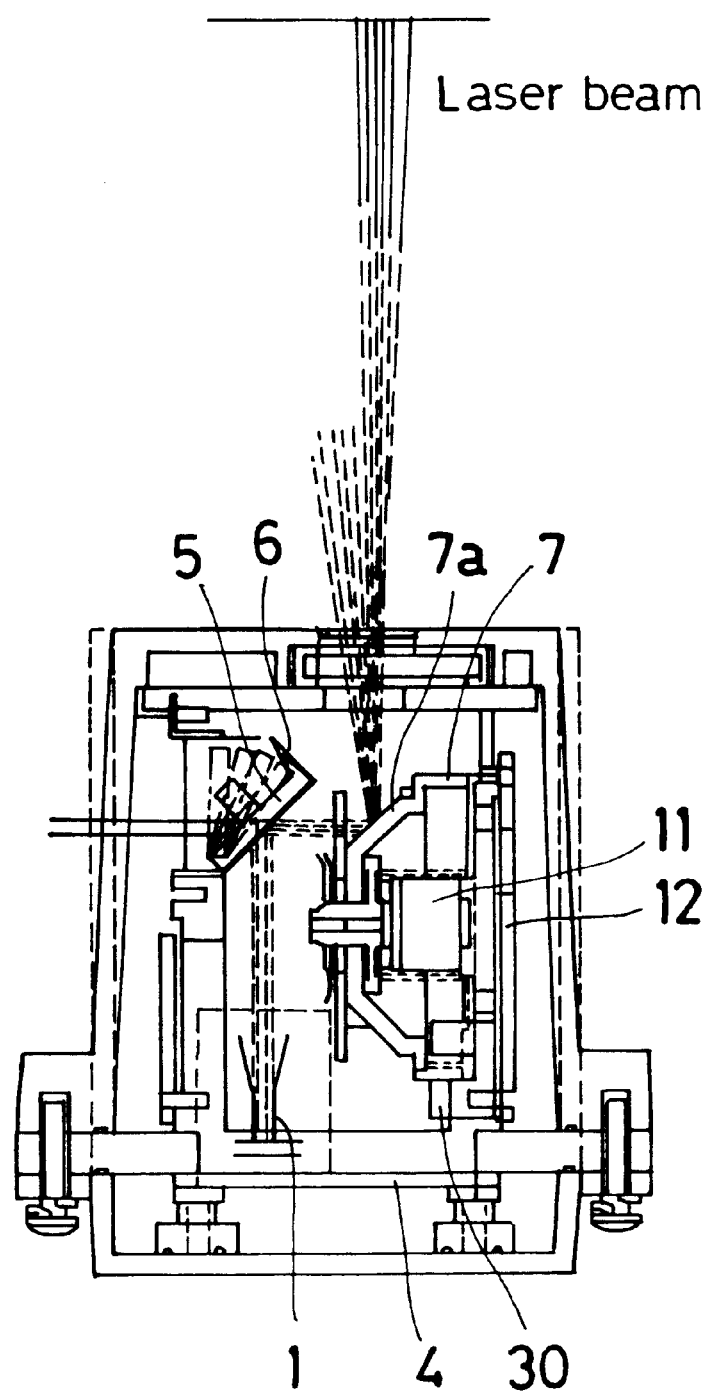
FIG. 4 is a view showing the beam transmitting unit of the optical scanning apparatus according to the embodiment of the invention.
Figure 5:
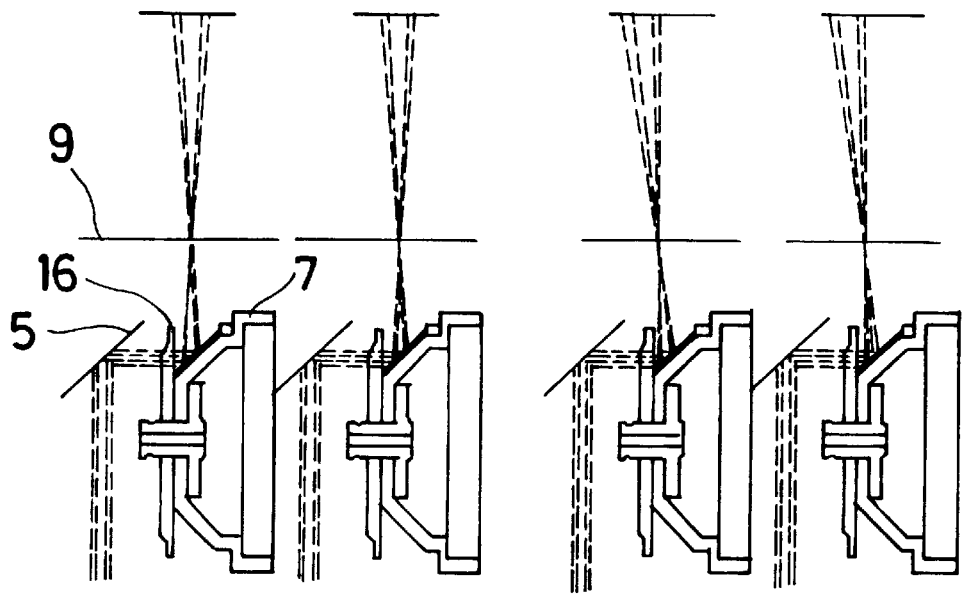
FIGS. 5a, 5b, 5c and 5d are views showing directions of emitting laser beam when a reflecting face of a polygonal mirror shown in FIG. 4 is rotated to thereby change an angle of reflection.

Next, an explanation will be given of a constitution of light transmitting unit TR of the light scanning apparatus RD in reference to FIG. 2 through FIG. 4. As shown by FIG. 2, the light transmitting unit TR is constituted mainly by the laser oscillator 13 provided with the laser diode 1 inside thereof for emitting a laser beam, a reflecting mirror 5 for reflecting the laser beam emitted from the laser oscillator 13 and changing the direction of the laser beam, a cylindrical lens 16 (refer to FIG. 8) in a shape of a disk plate for changing the emitting direction (shape) of the laser beam, a polygonal mirror 7 having a plurality of reflecting faces for deflecting the laser beam transmitted through the cylindrical lens 16 and a motor 11 for rotating the polygonal mirror 7. In such a construction, the laser beam emitted from the laser oscillator 13 is reflected and deflected by the reflecting mirror 5 and thereafter made incident on the cylindrical lens 16 to thereby change its radiating shape and is irradiated to the reflecting face (7a in FIG. 2) of the polygonal mirror 7.

The polygonal mirror 7 is installed with the cylindrical lens 16 having optical lens portions 16a and 16b in a cylindrical shape on the disk plate opposed to the reflecting faces 7a through 7h (refer to FIG. 7) provided on the polygonal mirror 7 to integrally rotate with the polygonal mirror 7 and the lens portions 16a and 16W are opposed to the reflecting faces 7g and 7h. In this case, the cylindrical lens 16 and the polygonal mirror 7 are separately installed, however, both of them can be installed integrally.

Based on the shape of the cylindrical lens 16 (plane portion 16c, lens portions 16a, 16b) opposed to the reflecting faces 7a through 7h, the laser beam transmits through the cylindrical lens 16 a narrowed beam or an optical axis thereof is changed by the lens portions (16a, 16b) and the shape of the beam is widened and thereafter, the laser beam is deflected by the polygonal mirror 7 and is emitted to the outside via a light transmitting window 9.

In the oscillator 13, the laser diode (LD) 1 is attached to a lower portion of the interior of a holder 2 formed in a cylindrical shape, a light transmitting lens 3 is installed at an upper portion of the holder and the holder is attached to and supported by a light transmitting circuit board 4. Further, the reflecting mirror 5 is attached above the laser oscillator 13 as shown in FIG. 2 to a mirror holder 6.

In contrast to the light emitting unit TR for emitting the laser beam, the light receiving unit RV receives the laser beam which has been reflected by an object and has returned and the reflected light is received through a light receiving window 23 of a case 14. Thereafter, the laser beam is transmitted through a lens 22 having a large radius of curvature and a lens 21 having a smaller radius of curvature, both of which are attached to a conical boss portion inside a frame and the reflected light is detected by a light receiving element (PIN photo diode) 20 attached to a light receiving board 24 installed below the lenses. A signal received by the light receiving element 20 is transmitted to the light receiving board 24 arranged below the lens 21, the light receiving board 24 is electrically connected to the light transmitting board 4 via a cable 25 connected to the light receiving board 24 and a signal is transmitted to the controller CT.

In this way, the light transmitting unit TR and the light receiving unit RV are installed integrally in the frame and the entire frame, including the light transmitting unit TR and the light receiving unit RV, is mounted inside the case member 14 of the optical scanning apparatus RD.

In such a construction, the polygonal mirror 7 for deflecting the laser beam of the light transmitting unit TR is rotated by the motor 11 fixed to a motor drive board 12. The angles of inclination (θ7a through θ7h) of the reflecting faces 7a through 7h (in FIG. 7, 1 through 8 faces) constituting side faces of a trapezoidal portion of the polygonal mirror 7 are different from each other in consideration of the deflecting, direction by rotating the motor. By rotating the polygonal mirror 7 by the motor 11, the position of the polygonal mirror 7 on which the laser beam is incident is changed and the direction of emitting the laser beam (emitting direction in z direction) can be changed by the angles of inclination 878 through 07h of the reflecting faces 7a through 7h (refer to FIGS. 5a through 5d).

Specifically, by using a laser oscillator 13 capable of reaching a predetermined distance (about 100 m in the y direction) and having a divergence of 0.86 degree (x direction)×0.39 degree (z direction) and by using the reflecting faces 7a through 7h of the polygonal mirror 7 and the lens portion 16a or 16b of the cylindrical lens 16, the laser beam can be transmitted with a divergence in accordance with the shapes of the lens portions 16a and 16b of the cylindrical lens 16 or transmitted in a state in which the beam is narrowed without being widened by the plane portion 16c. The laser beam which has been transmitted through the cylindrical lens 16 is incident on the polygonal mirror 7 and reflected thereby to change the deflecting direction and accordingly, the emitting range (detection range in x direction) can be widened by scanning the laser beam by rotating the polygonal mirror 7.

Further, the number of the reflecting faces of the polygonal mirror 7 provided on a circumference may be changed and the lens portions 16a and 16b shown by FIG. 8 may be provided on both faces of the disk or the plane portion 16c may be formed in a shape of a prism. When a face of the disk is formed in a shape of a lens as shown by FIG. 9, by changing the plate thickness dimension T of the disk and the radius of curvature R of the lens, an angle of incidence θ1 and a beam width θ2 are changed. Further, when the shape of a prism is formed, by changing an angle of inclination θ of a prism face, it is possible to change only the angle of incidence θ1 and the beam width θ2 is made constant. It is also possible to change the shapes of the lens portions 16a and 16b of the cylindrical lens 16 and make the polygonal mirror 7 reflect the laser beam to thereby change the angles of emittance in the x direction and the z direction.

In this way, when the lens 16a, the plane portion 16c, or the prism are provided in the peripheral direction of the cylindrical lens 16 to be opposed to the reflecting faces 7a through 7h and the polygonal mirror 7 and the cylindrical lens 16 are rotated together to thereby change the optical axis of the laser beam, it is also possible to change only the direction of the beam while making the reflecting faces 7a, 7b, of: the polygonal mirror 7 stay in a constant inclination to thereby change the width of emittance of the beam by the cylindrical lens 16.

Next, an explanation will be given with respect to the operation of the optical scanning apparatus RD with reference to FIG. 10. At step S101, an initializing processing is carried out. In the initializing processing, ROM and RAM inside the controller are checked and initial values are set to memories necessary for the processing and whether the system is normally operating is checked. At step S102, stored light emitting direction tables are read. In reading the light emitting direction tables, light emitting patterns of the laser beam are previously stored in the memory and a light emitting pattern 1 for long distance/very short distance (for both remote and close) and a light emitting pattern 2 for very short distance are read from the memory.

According to the light emitting pattern 1, a light emitting pattern when the rotational speed of the polygonal mirror 7 is made constant is stored and the rotational speed of the polygonal mirror 7 may be controlled based on the light emitting pattern. According thereto, as shown by FIG. 11a, a light emitting time period T1 is set for each of the reflecting faces 7a through 7f (reflecting faces 1 through 6) of the polygonal mirror 7 (light emittance is repeated at a predetermined period during T1) and a light emitting time period T2 is set for each of the reflecting faces 7g and 7h (reflecting faces 7 and 8) (light emittance is repeated at a predetermined period during T2) to thereby emit the laser beam. Further, according to the light emitting pattern 2, as shown by FIG. 11b, the laser beam is not emitted at the reflecting faces 7a through 7f of the polygonal mirror 7 and the laser beam is emitted only at the reflecting faces 7g and 7h during the light emitting time period of T2 (light emittance is repeated at a predetermined period during T2).

By adopting such light emitting patterns, in the case of the light emitting pattern 1, both a narrowed laser beam and widened laser beam can be emitted (refer to FIG. 13a). That is, a position where the laser beam is incident is gradually changed by rotating the polygonal mirror 7, at the reflecting face 7a, (by the rotation) a portion of scanning line 1 is scanned in the x direction designated by FIG. 12 from left to right by the laser beam (emittance range of x direction 0.36 degree, z direction: 0.86 degree), at the reflecting face 7b contiguous to the reflecting face 7a, scanning is carried out on scanning line 2 from left to right and similarly, scanning lines 3 through 6 are scanned. Thereafter, when the position where the laser beam is incident reaches the reflecting face 7g, the width of the laser beam is widened by the lens 16a and accordingly, the scanning line 7 is scanned in the x direction from left to right by the laser beam having a beam shape widened by the polygonal mirror 7g (x direction: 0.36 degree, z direction: 7.7 degree). Thereafter, at the reflecting face 7h the width of the laser beam is similarly widened by the lens 16b and accordingly, the scanning line 8 is scanned by the laser beam in the x direction from left to right to thereby widen a scanning area when viewed as a front plane as shown by FIG. 12 and scan a predetermined area (xz plane) causing no failure in detection.

Accordingly, in the case of the light emitting pattern 1, the scanning lines 1 through 6 are scanned in the state in which the beam is narrowed and the scanning lines 7 and 8 are scanned in the state in which the beam is widened and accordingly, there is constructed a detection range for both remote and close (refer to FIG. 13a). Further, in the case of the light emitting pattern 2, the beam is widened and the beam is not emitted to the scanning lines 1 through 6, the beam is emitted to only the scanning lines 7 and 8 and accordingly, there is constructed a detection range for short distance (refer to FIG. 13b).

After having read such light emitting patterns, at step S103, first, in order to provide the laser beam emitting range (detection range) of FIG. 13a, the light emitting pattern is set to the light emitting pattern of table 1 and at step S104, the controller CT instructs the motor to rotate the polygonal mirror 7 and outputs the motor drive signal to the motor driving circuit MD.

In this case, when the motor 11 is instructed to rotate and the polygonal mirror 7 starts rotating, successively, whether or not a reference position of the polygonal mirror 7 is detected is checked. The reference position of the polygonal mirror 7 is detected by a photo interrupter (motor position detecting sensor) 30 installed adjacent to the polygonal mirror 7 and the detection is determined by whether the notch 7i (reference position) provided at the outer periphery of the polygonal mirror 7 is detected. The notch 7i constitutes the reference position setting portion. Further, the notch 7i is formed by forming the polygonal mirror 7 from a colorless transparent resin and forming the mirror at a location other than the portion of the notch 7i by surface treatment to thereby make only the location provided with the-notch transparent. In this case, the polygonal mirror 7 is rotated until the reference position is detected and when the notch 7i is detected, at a successive step S106, based on the light emitting pattern, the laser beam is instructed to emit. That is, here, the beam emitting signal is outputted such that the beam is emitted by the light emitting pattern 1. When the light emitting instruction is issued, at step S107, a range counter starts counting and at a successive step S108, whether the laser beam returns by being reflected by an object in a forward direction (foregoing vehicle) is checked by determining whether or not the beam is received.

When there is a reflected beam, at step S109, the operation issues an instruction of stop counting to the range counter and carries out a calculating operation of an inter-vehicle distance at step S110. In this case, there is calculated from a value of the range counter, a time period by which the laser beam is emitted to the outside and incident on an object in a forward direction (for example, a reflector of foregoing vehicle), the laser beam is reflected and the reflected beam returns. Meanwhile, the beam speed has already been known as $3\times10^8$ m/sec and accordingly, from beam speed x range counter value (a time period by which laser beam is emitted and returns), a distance between the apparatus and an object present in the forward direction (for example, foregoing vehicle FC) (inter-vehicle distance) is calculated. In this case, it is known whether the laser beam is reflected at a position to which the polygonal mirror 7 is rotated to move from the reference position at which the notch 7i of the polygonal mirror 7 is detected and is emitted to outside, further, the light emitting position and it is known at what timing the laser beam is emitted by the light emitting pattern. Accordingly, an orientation in which the object (for example, foregoing vehicle FC) is present can also be calculated by a publicly-known calculating method. Thereafter, it is checked whether one procedure of the measuring operation has been finished (whether the laser beam is emitted to one point on a scanning line and the laser beam is reflected) and when the measuring operation is in the midst of the one procedure, the operation returns to step S106 and the processings from step S106 are repeated. When the one procedure of the measuring operation has been finished, successively, at step S112 it is determined whether the object is the foregoing vehicle FC running in the forward direction or an interrupting vehicle IC. In this case, for example, there is adopted a method of recognizing the foregoing vehicle FC present in front of the driving vehicle by the presence or the absence of the reflected beam and the intensity of the reflected beam. Accordingly, grouping is carried out by points on the scanning line where the optical intensity of the reflected beam is substantially at the same level and the front foregoing vehicle FC is recognized by a publicly-known recognizing method based on the grouped shape (whether the grouped shape is a shape indicating the vehicle). In this case, when the foregoing vehicle FC is recognized, a relative distance L between the foregoing vehicle FC and the driving vehicle MC is calculated and the change amount $\Delta L$ of the relative speed L and the hange amount $\Delta Lx$ in the x direction are successively calculated. When another vehicle is detected within the detection range from the state of the reflected beam, also in the case of the vehicle, a relative distance La between the vehicle and the driving vehicle, a change amount $\Delta La$ of the relative speed and a change amount $\Delta Lxa$ in the x direction are calculated. When the foregoing vehicle FC is being detected, in the case in which the change amount of the relative distance and the change amount in the x direction exceeds thresholds under which the foregoing vehicle FC can be moved in a short predetermined time period, the vehicle is determined to be the interrupting vehicle IC. Similarly thereto, when the foregoing vehicle FC is present within the detection range, and another vehicle is being detected at the same time, in the case in which the change amount of the relative distance and the change amount in the x direction exceed the thresholds under which the foregoing vehicle can move and the vehicle is out of the detection region, the vehicle is determined to be a departing vehicle.

In this way, the foregoing vehicle FC, the interrupting vehicle IC and the departing vehicle RC are determined and at step S113, a speed control apparatus carries out a speed control compatible with the relative speed. In this case, the speed control apparatus corresponds to a throttle apparatus for controlling the amount of air supplied to a cylinder portion of an engine, a brake apparatus operating a brake on a vehicle when the vehicle speed is more than necessary and an automatic transmission for down shifting gears by one stage during running.

Thereafter, the inter-vehicle distance between the driving vehicle and the foregoing vehicle FC is checked. When the inter-vehicle distance between the driving vehicle and the foregoing vehicle FC is equal to or smaller than a first inter-vehicle distance (for example, 10 m) or equal to or larger than a second inter-vehicle distance (for example, 100 m), at step S115, a laser beam is emitted by the light emitting pattern (a mode for both remote and close) based on the light emitting pattern table 1 (FIG. 11a). At an intermediate distance between the first inter-vehicle distance and the second inter-vehicle distance, the laser beam is emitted by the light emitting pattern (mode for short distance) based on the light emitting pattern table 2 (FIG. 11b). At step S117, it is checked whether the total procedure of the measuring operation has been finished and when the entire procedure of the measuring operation has been finished, the processings are finished. When the measuring operation is in the midst of the procedure, the operation returns to step S106 and the same processings from step S106 are repeated.

Figure 14:
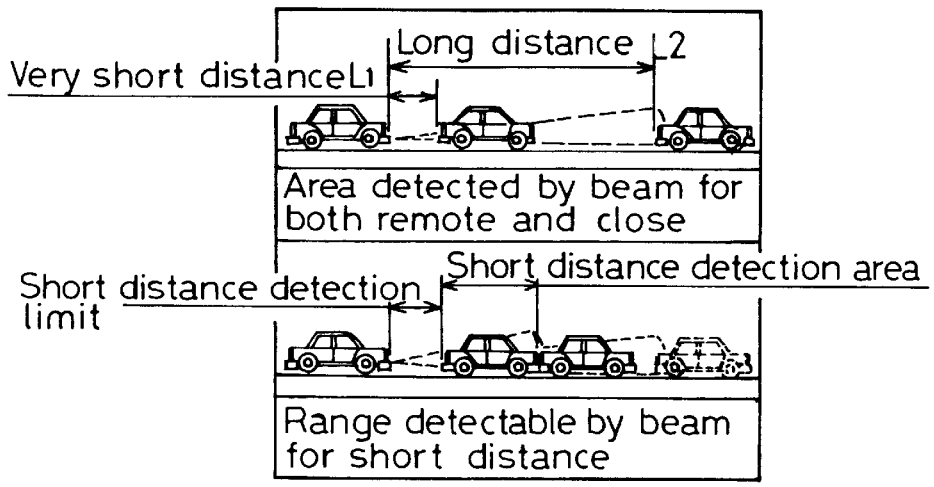
FIG. 14 is a view showing the detection ranges of the laser beam when the mode of the optical scanning apparatus according to the embodiment of the invention is switched.
Figure 16:
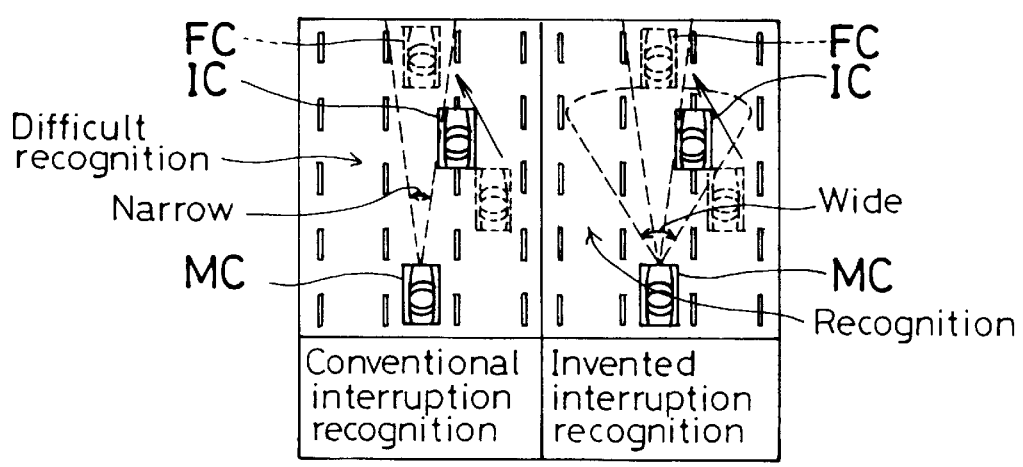
FIG. 16 is a view comparing detection ranges of the conventional example and the invention.

As described above, according to the invention, not only the two-dimensional beam scanning lines are emitted to an arbitrary location (a location intended to detect a vehicle in forward direction) by the polygonal mirror 7 and the cylindrical lens 16 but also the width of the scanning lines are controlled by rotating the polygonal mirror to thereby enable the selective use of the ranges of the laser beam and scan in wide angles. Accordingly, not only the foregoing vehicle FC but also the interrupting vehicle IC or the departing vehicle RC can be detected (refer to FIG. 13, FIG. 14 and FIG. 16).

When the apparatus of the invention is used, in the case of detecting the foregoing vehicle FC, by the long distance beam, the foregoing vehicle at a long distance of 40 in or more where reflector reflection is used and at a very short distance of 10 in or less can be detected and by the short distance beam, the foregoing vehicle at a distance of about 10 in through 50 m can be detected.

In this case, according to the mode for a short distance, the laser beam is not emitted at the reflecting faces 7a through 7f of the polygonal mirror 7 and accordingly, a number of times of emitting the laser beam is reduced and accordingly, life of the laser oscillator 13 is promoted.

Further, although according to the embodiment, the laser beam is switched in accordance with a surrounding situation by the mode of emitting a narrowed laser beam and a widened laser beam (mode for both remote and close) and the mode of emitting a widened laser beam (short distance mode) and the scanning may be carried out by alternately switching the narrowed laser beam and the widened laser beam.

While the preferred embodiments have been described, variations thereto will occur to those skilled in the art within the scope of the present inventive concepts which are delineated by the following claims.

What is claimed is:

1. An optical scanning apparatus for emitting a scanning laser beam in a forward direction for detecting an object in the forward direction by a reflected beam derived from the laser beam, said optical scanning apparatus including:
    a first mode for emitting a narrowed laser beam and a widened laser beam; and
    a second mode of emitting the widened laser beam;
    wherein the first mode and the second mode are periodically switched.

2. The optical scanning apparatus according to claim 1:
    wherein the first mode and the second mode are switched by detecting a distance between the apparatus and the object from information derived from the reflected beam or advance of the object into a range of emitting the laser beam or departure thereof to outside of the range.

3. The optical scanning apparatus according to claim 2:
    wherein the first mode is utilized when the distance between the apparatus and the object is equal to or smaller than a first predetermined distance or equal to or larger than a second predetermined distance and the second mode is utilized when the distance between the apparatus and the object falls in a range between the first predetermined distance and the second predetermined distance.

* * * * *